United States Patent
Hollis et al.

(10) Patent No.: US 11,283,693 B2
(45) Date of Patent: Mar. 22, 2022

(54) SUMMARIZED EVENT DATA RESPONSIVE TO A QUERY

(71) Applicant: Microsoft Technology Licensing, LLC, Redmond, WA (US)

(72) Inventors: William Kendall Hollis, Duvall, WA (US); Gueorgui Bonov Chkodrov, Redmond, WA (US); David Lloyd Fosth, Lake Stevens, WA (US); Jose Wilson Morris, Bothell, WA (US); Russell E. Biles, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 213 days.

(21) Appl. No.: 16/538,608

(22) Filed: Aug. 12, 2019

(65) Prior Publication Data
US 2021/0051082 A1 Feb. 18, 2021

(51) Int. Cl.
*H04L 12/00* (2006.01)
*H04L 43/028* (2022.01)
*G06F 16/903* (2019.01)
*G06F 16/9035* (2019.01)
*H04L 43/022* (2022.01)
*H04L 29/06* (2006.01)

(52) U.S. Cl.
CPC ........ *H04L 43/028* (2013.01); *G06F 16/9035* (2019.01); *G06F 16/90335* (2019.01); *H04L 43/022* (2013.01); *H04L 63/1425* (2013.01)

(58) Field of Classification Search
CPC . H04L 43/028; H04L 43/022; H04L 63/1425; G06F 8/38; G06F 16/90335; G06F 9/542; G06F 9/451; G06F 16/9035

USPC .......................... 726/22; 707/769, 770, 758
See application file for complete search history.

(56) References Cited

U.S. PATENT DOCUMENTS

| | | | | |
|---|---|---|---|---|
| 6,768,994 B1* | 7/2004 | Howard | ............... | G06F 16/9537 |
| 7,379,848 B2* | 5/2008 | Yu | ........................... | G06Q 10/10 |
| | | | | 702/186 |
| 7,809,694 B2* | 10/2010 | Nelson | ................ | G06F 16/2453 |
| | | | | 707/688 |
| 8,666,916 B2* | 3/2014 | Punera | ................... | G06N 7/005 |
| | | | | 706/12 |
| 8,738,572 B2* | 5/2014 | Bird | .................. | G06F 16/24568 |
| | | | | 707/636 |

(Continued)

OTHER PUBLICATIONS

"International Search Report and Written Opinion Issued in PCT Application No. PCT/US20/037984", dated Sep. 28, 2020, 11 Pages.

*Primary Examiner* — Frantz Coby
(74) *Attorney, Agent, or Firm* — Mannava & Kang, P.C.

(57) ABSTRACT

According to examples, an apparatus may include a processor and a computer readable medium on which is stored machine readable instructions that may cause the processor to receive a query, in which the query may define an event pertaining to the apparatus to be identified and summarization instructions. The processor may also implement the query on tracked events pertaining to the apparatus to identify event data pertaining to the apparatus that matches the event defined in the query and summarize the identified event data according to the summarization instructions to generate summarized event data responsive to the query. The processor may further output the summarized event data.

20 Claims, 4 Drawing Sheets

(56) References Cited

U.S. PATENT DOCUMENTS

| | | | | |
|---|---|---|---|---|
| 8,806,620 B2* | 8/2014 | Purcell | ............... | G06F 21/554 |
| | | | | 726/22 |
| 9,990,386 B2* | 6/2018 | Marquardt | ............ | G06F 16/248 |
| 10,474,682 B2* | 11/2019 | Patel | ................ | G06F 11/2094 |
| 10,599,698 B2* | 3/2020 | Burton | ........... | G06Q 10/063118 |
| 10,685,001 B2* | 6/2020 | Marquardt | ............ | G06F 16/951 |
| 10,757,061 B1* | 8/2020 | Xu | ........................ | H04L 51/32 |
| 2003/0084340 A1* | 5/2003 | Schertz | ................ | H04L 67/02 |
| | | | | 726/23 |
| 2012/0035961 A1* | 2/2012 | Dvorak | ................ | G16H 40/20 |
| | | | | 705/3 |
| 2014/0214843 A1* | 7/2014 | Arvig | ................ | G06Q 50/01 |
| | | | | 707/740 |
| 2014/0277753 A1* | 9/2014 | Eiynk | ................ | G05B 15/02 |
| | | | | 700/275 |
| 2015/0363489 A1* | 12/2015 | Burton | ........... | G06Q 10/063118 |
| | | | | 707/738 |
| 2016/0140128 A1* | 5/2016 | Swan | ................ | G06F 16/2228 |
| | | | | 707/725 |
| 2016/0224676 A1* | 8/2016 | Miller | ............... | G06F 17/30365 |
| 2018/0032596 A1* | 2/2018 | Bolotskikh | .......... | G05B 19/042 |
| 2018/0314393 A1* | 11/2018 | Filippi | ................ | G06F 16/345 |
| 2019/0102436 A1* | 4/2019 | Bishnoi | ................ | G06F 16/244 |
| 2019/0155804 A1* | 5/2019 | Miller | ................ | G06Q 10/00 |
| 2019/0205293 A1* | 7/2019 | Marquardt | .......... | G06F 16/2228 |
| 2020/0067790 A1* | 2/2020 | Hsiao | ................ | H04L 41/22 |
| 2020/0142378 A1* | 5/2020 | Bolotskikh | ........... | G06F 16/254 |
| 2021/0034623 A1* | 2/2021 | Sabhanatarajan | ........................... | |
| | | | | G06F 16/24542 |

\* cited by examiner

SUMMARIZED EVENT DATA RESPONSIVE TO A QUERY

BACKGROUND

Data corresponding to activities across a network or across multiple networks may be collected for various purposes. For instance, the data may be collected for various types of analytics operations, for display of the types of activities occurring, for anomalous activity detection, etc. Activities across networks have grown exponentially over the years as computer and telecommunication technologies have become integral for many individuals, businesses, and organizations. As a result, collected data corresponding to the network activities has also increased exponentially.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
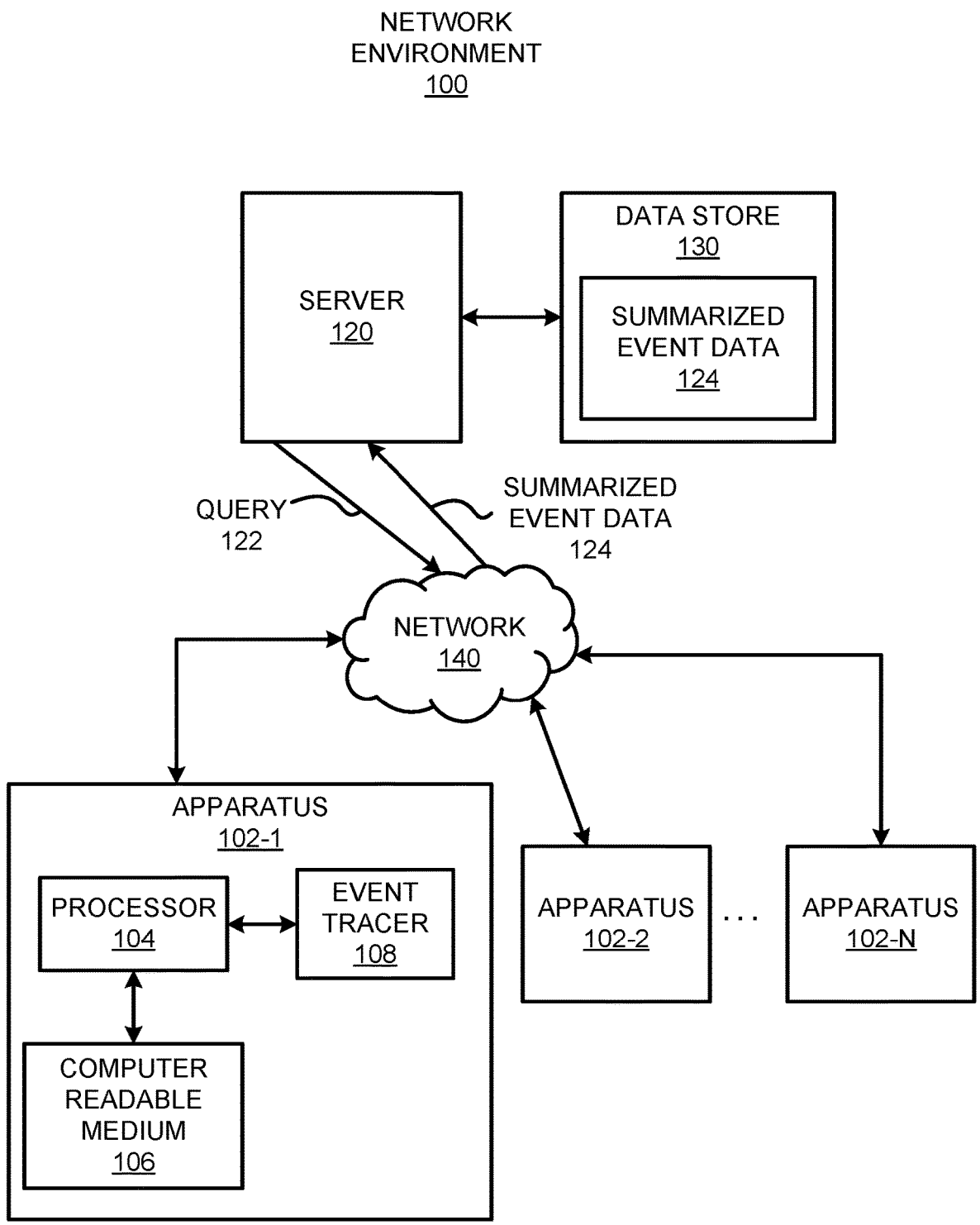
FIG. 1 depicts a block diagram of a network environment that may include an apparatus, in which the apparatus may generate and output summarized event data responsive to a query, in which the query may define an event pertaining to the apparatus to be identified, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses, methods, and computer readable media that may identify event data pertaining to an apparatus in which the identified event data may match an event identified in a query. That is, a processor of an apparatus disclosed herein may implement the query to identify the event data pertaining to the apparatus that matches the event defined in the query. The processor may receive the query from a server and thus, the server may instruct the processor to identify particular types of event data. For instance, the server may send the query to the processor, in which the query may define an event to which the event data is to match. The event may correspond to, for instance, an event that may be correlated to a known or suspected anomalous activity, such as certain network traffic event occurring on the apparatus. As discussed herein, the processor may implement a standing query on accessed data, e.g., the processor may implement the standing query as the data is received. In this regard, the accessed data may not need to be stored for the processor to implement the query on the data.

As discussed herein, the processor may summarize the identified event data that match the event defined in the query. The processor may summarize the identified event data by reducing the number of elements included in the identified event data. That is, the processor may remove some of the elements included in the event data to generate a summarized event data. In some examples, the server may include summarization instructions in the query sent to the processor, in which the summarization instructions may define a set of features in the identified event data that are to be included in the summarized event data. For instance, the summarization instructions may indicate that certain types of information, such as packet identifiers, process identifiers, source addresses, or the like, be included in the summarized event data, which may be useful for anomalous activity detection. In some examples, the processor may include only the types of information included in the summarization instructions in the summarized event data and may thus omit other types of information from the summarized event data. As such, for instance, the summarized event data may have a smaller file size as compared with the identified event data.

A technical issue associated with identifying information for use in detecting anomalous activity in apparatuses, such as network apparatuses, may be that the identified information may occupy a large amount of storage space, thus requiring large storage devices. For instance, the storage devices at which the identified information may be aggregated from multiple apparatuses may be large. One manner in which the storage space may be reduced may be to sample activity data instead of analyzing most or all of the activity data. However, sampling activity data may result in missed anomalous activities, erroneous results, and/or inaccurate results.

Through implementation of the apparatuses, methods, and computer readable media disclosed herein, information for use in detecting anomalous activity may accurately be identified and the file size of the information may be reduced. That is, a processor disclosed herein may implement a query on tracked event data, e.g., without sampling the event data, such that each of the tracked event data may be filtered with respect to an event, e.g., a query term, defined in a query. As a result, the event data identified as matching the query may accurately identify the events pertaining to the apparatus that match the query.

In addition, the processor disclosed herein may summarize the identified event data according to defined summarization instructions. In this regard, the processor may reduce the information included in the identified event data to information that may comply with the summarization instructions. This may include removing some of the information included in the identified event data, which may reduce the file size of the identified event data. That is, the summarized event data may have a relatively smaller file size than the identified event data. As a result, communication of the summarized event data may occupy a smaller network bandwidth as compared with communication of the identified event data. In addition, the summarized event data may be stored in a relatively smaller storage device than the identified event data. As a result, for instance, the summarized event data may be stored in a relatively more efficient manner than the identified event data. Moreover, processing of the summarized event data for anomalous activity detection may be performed more efficiently than processing of the identified event data, e.g., with a lower amount of processing resources, a lower amount of storage resources, etc.

Reference is first made to FIG. 1, which shows a block diagram of a network environment 100 that may include an apparatus 102-1, in which the apparatus 102-1 may generate and output summarized event data responsive to a query, in which the query may define an event pertaining to the apparatus 102-1 to be identified, in accordance with an embodiment of the present disclosure. It should be understood that the network environment 100 and the apparatus 102-1 depicted in FIG. 1 may include additional features and that some of the features described herein may be removed and/or modified without departing from the scopes of the network environment 100 and/or the apparatus 102-1.

The apparatus 102-1 may be a client computing device, a server, a node, a gateway, a network switch, and/or other type of device that may be employed in a network environment 100. The apparatus 102-1 may include a processor 104, a computer readable medium 106, and an event tracer 108, which are described in further detail herein with respect to FIG. 2. The network environment 100 may also include a plurality of additional apparatuses 102-2 to 102-N, in which the variable "N" may represent a value greater than one. Each of the additional apparatuses 102-2 to 102-N may be similarly configured as the apparatus 102-1. As such, the description of the apparatus 102-1 provided herein may equally apply to the other apparatuses 102-2 to 102-N.

The network environment 100 may also include a server 120 and a data store 130. The server 120 may communicate with the apparatuses 102-1 to 102-N via a network 140, which may include a local area network and/or a wide area network, such as the Internet. In some examples, the server 120 and the apparatuses 102-1 to 102-N may be collocated, for instance, in a common building such as a data center. In other examples, the server 120 may be remotely located from some or all of the apparatuses 102-1 to 102-N. In any of these examples, the server 120 may communicate instructions to the apparatuses 102-1 to 102-N to provide summarized event data 124 pertaining to the apparatuses 102-1 to 102-N. In some examples, the instructions may individually be directed to the apparatuses 102-1 to 102-N such that the apparatuses 102-1 to 102-N to which the instructions are applicable may execute the instructions. In addition, or alternatively, the server 120 may communicate different instructions to some or all of the apparatuses 102-1 to 102-N such that different ones of the apparatuses 102-1 to 102-N may implement different queries and/or summarizations in response to receipt of the instructions.

In any of the examples discussed herein, the server 120 may communicate instructions that may include a query 122 to be applied to event data pertaining to the apparatuses 102-1 to 102-N. That is, the server 120 may communicate a query 122 that may define an event pertaining to an apparatus 102-1 that the apparatus 102-1 is to identify and summarize. The event may correspond to a particular type of event and/or a particular event that the apparatus 102-1 may encounter. For instance, the event may correspond to a particular event identifier, which may itself correspond to particular type of network traffic flowing to and/or through the apparatus 102-1, a particular type of process corresponding to the network traffic, and/or the like. In this regard, an administrator or other user may define the query 122 at the server 120 to identify data corresponding to particular events and the server 120 may communicate the query 122 to the apparatus 102-1 and/or to selected ones of the apparatuses 102-1 to 102-N.

The query 122 may also define summarization instructions that the apparatus 102-1 is to follow in summarizing event data pertaining to the apparatus 102-1 that have been identified as matching the event defined in the query 122. The summarization instructions may define a set of features in the identified event data that are to be included in the summarized event data 124. In other examples, the summarization instructions may define a set of features in the identified event data that are to be omitted from the summarized event data 124. In any of these examples, the processor 104 of the apparatus 102-1 may identify the set of features in the identified event data and may either include or exclude the set of features from the summarized event data 124. In this regard, an administrator or other user may define the summarization instructions in the query 122 at the server 120 to define the contents of the summarized event data 124.

In addition, the processor 104 may output, e.g., upload, the summarized event data 124 to the server 120 via the network 140. The server 120 may also store the summarized event data 124 in a data store 130 to which the server 120 has access. The data store 130 may be directly connected to the server 120 or may be connected via a network connection, e.g., via the network 140 or another network connection.

According to examples, the summarized event data 124 may be analyzed to determine whether events corresponding to potential anomalous behavior have occurred on the apparatus 102-1. Particularly, for instance, the summarized event data 124 may be used to determine whether a certain process or network traffic from a particular source that may be anomalous and/or malicious has occurred on the apparatus 102-1. As discussed herein, the summarized event data 124 may have a relatively fewer number of features corresponding to the identified event data and thus, may have a smaller file size as compared with the identified event data. As a result, the summarized event data 124 may occupy a relatively smaller amount of network bandwidth while being communicated to the server 120. In addition, the summarized event data 124 may occupy a relatively smaller amount of storage space in the data store 130, which may enable the data store 130 to be relatively smaller, e.g., the summarized event data 124 may use relatively small storage space, which may make storage of the summarized event data 124 more efficient than storage of the identified event data. The data store 130 may also be relatively smaller because the server 120 may communicate instructions to submit the summarized event data 124 to targeted ones of the apparatuses 102-1 to 102-N instead of all of the apparatuses 102-1 to 102-N, which may reduce the total amount of summarized event data 124 that the server 120 receives.

According to examples, the server 120 may also communicate other types of instructions to the apparatuses 102-1 to 102-N. These instructions may include, for instance, instructions for the apparatuses 102-1 to 102-N to perform other types of queries. By way of example, the instructions may include a request for the apparatuses 102-1 to 102-N to perform a query on other data. For instance, the server 120 may request that an apparatus 102-1 perform a query for a file hash, a time, a file size, or other data from an operating system of the apparatus 102-1. The server 120 may communicate these types of instructions in instances in which, for instance, an anomaly is detected and the server 120 seeks additional information from the apparatus 102-1.

Although particular reference is made herein to the server 120 as both sending the query 122 and receiving the summarized event data 124, it should be understood that a separate server (not shown) may instead receive the summarized event data 124 and store the summarized event data 124 in the data store 130. By way of particular example in which the event data pertains to transmission control protocol (TCP) traffic, the query 122 may be directed to identifying Internet protocol (IP) packets flowing to and/or through the apparatus 102 and the IP packets may be summarized by unique IP addresses in the TCP traffic.

Figure 2:
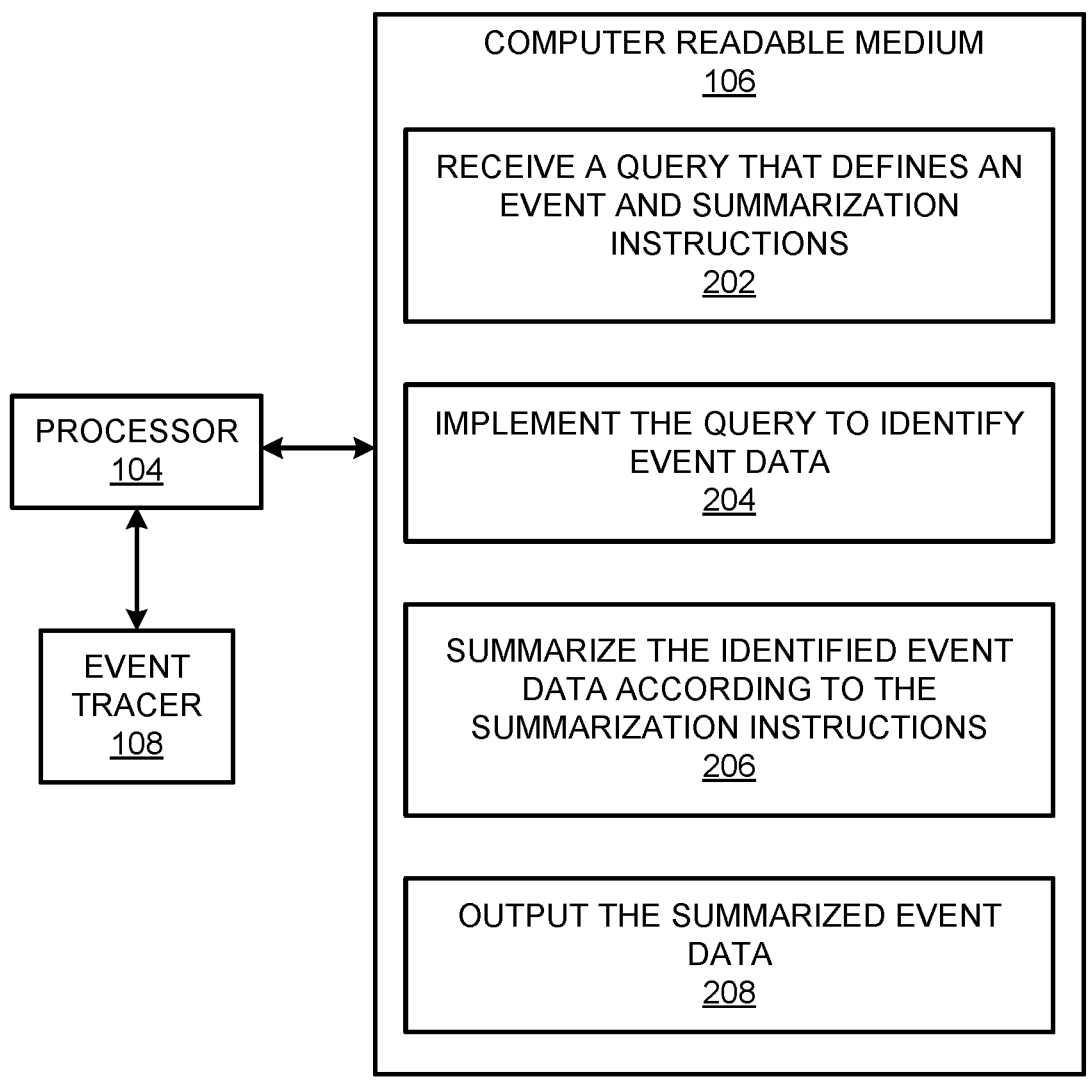
FIG. 2 shows block diagram of the apparatus depicted in FIG. 1 in accordance with an embodiment of the present disclosure.

Turning now to FIG. 2, there is shown a block diagram of the apparatus 102-1 depicted in FIG. 1 in accordance with an embodiment of the present disclosure. It should be understood that the apparatus 102-1 depicted in FIG. 2 may include additional features and that some of the features described herein may be removed and/or modified without departing from the scope of the apparatus 102-1. The description of the apparatus 102-1 is made with reference to FIG. 1 for purposes of illustration.

The processor 104 may be a semiconductor-based microprocessor, a central processing unit (CPU), an application specific integrated circuit (ASIC), a field-programmable gate array (FPGA), and/or other hardware device. Although the apparatus 102-1 is depicted as having a single processor 104, it should be understood that the apparatus 102-1 may include additional processors and/or cores without departing from a scope of the apparatus 102-1. In this regard, references to a single processor 104-1 as well as to a single computer readable medium 106 may be understood to additionally or alternatively pertain to multiple processors 104 and multiple computer readable mediums 106.

The computer readable medium 106 may each be, for example, a Random Access memory (RAM), an Electrically Erasable Programmable Read-Only Memory (EEPROM), a storage device, an optical disc, or the like. The computer readable medium 106, which may also be referred to as a machine readable storage medium, may be a non-transitory computer readable storage medium, where the term "non-transitory" does not encompass transitory propagating signals. In any regard, the computer readable medium 106 may have stored thereon machine readable instructions 202-208.

The processor 104 may fetch, decode, and execute the instructions 202 to receive a query 122, for instance, from the server 120 via the network 140. The query 122 may define an event pertaining to the apparatus 102-1 to be identified. As discussed herein, the event defined in the query 122 may correspond to a particular type of event and/or a particular event that the apparatus 102-1 may encounter. For instance, the event may correspond to a particular event identifier, a particular type of network traffic flowing to and/or through the apparatus 102-1, a particular type of process corresponding to the network traffic, and/or the like. Although the query 122 is described herein as defining a single event, it should be understood that the query 122 may define any number of events without departing from a scope of the present disclosure.

The processor 104 may fetch, decode, and execute the instructions 204 to implement the query 122 on tracked events pertaining to the apparatus 102-1 to identify event data pertaining to the apparatus 102-1 that match the event defined in the query 122. In some examples, the processor 104 may implement the query 122 on event data as the event tracer 108 collects the tracked events. In these and other examples, the processor 104 may have activated or otherwise may have instructed the event tracer 108 to trace identifiable events occurring in the apparatus 102-1. The event tracer 108 may be any suitable type of application and/or facility that may be executed on the apparatus 102-1 to trace or track events occurring in the apparatus 102-1. By way of example, the event tracer 108 may be the Event Tracing for Windows™ available from Microsoft Corporation™, which may generally be defined as a low-overhead tracing system provided by a Windows™ operating system. In these examples, the event tracer 108 may be an application or functionality that may be pre-installed on the apparatus 102-1. In other examples, however, the event tracer 108 may be other types of event tracers and may be installed prior to execution.

In some examples, the processor 104 may track the occurrence of events pertaining to the apparatus 102-1 in real time, e.g., as the events occur, and may thus implement a standing query on the tracked events. In these examples, the event tracer 108 may track occurrences of events on the apparatus 102-1 and may send event data corresponding to the occurrence of the events to the processor 104, e.g., as a stream of data. In addition, the processor 104 may continuously implement the query 122 on the tracked events (e.g., event data) received from the event tracer 108 to identify event data pertaining to the apparatus 102-1 that match the event defined in the query 122. That is, for instance, the processor 104 may continuously implement the query 122 to identify event data that has a feature that matches the event defined in the query 122, e.g., has a matching event identifier, a matching source address, a matching destination address, a matching process identifier, and/or the like. In other words, the processor 104 may continuously filter the tracked events received from the event tracer 108 to identify event data of the tracked events that match the event defined in the query 122 as the tracked events are received.

In other examples, the event tracer 108 may store the tracked events into a log of tracked events. In these examples, the processor 104 may access the log of event data corresponding to the tracked events pertaining to the apparatus 102-1. In addition, the processor 104 may implement the query 122 on the accessed log of event data to identify event data pertaining to the apparatus 102-1 that match the event defined in the query 122.

According to examples, the event tracer 108 may track network traffic events pertaining to the apparatus 102-1. The network traffic events may include, for instance, network traffic (e.g., packets of data) flowing to and/or through the apparatus 102-1, processes corresponding to the network traffic, and/or the like. In addition, the network traffic data may include information pertaining to event identifiers, source addresses of packets, destination addresses of packets, numbers of packets corresponding to the source and/or destination addresses, types of processes corresponding to the packets, payload sizes, payload types, packet identifiers, and/or the like.

According to examples, the processor 104 may implement the query 122 on all of the event data that the event tracer 108 tracked. In this regard, and in contrast to other implementations that may sample tracked event data, implementation of the query 122 may result in the processor 104 identifying a more accurate set of event data that match the event defined in the query 122.

The processor 104 may fetch, decode, and execute the instructions 206 to summarize the identified event data according to the summarization instructions defined in the query 122 to generate summarized event data 124 responsive to the query 122. Generally speaking, the processor 104 may summarize the identified event data such that the summarized event data 124 may include features as defined in the query 122. For instance, the summarization instructions included in the query 122 may define a set of features in the identified event data that are to be included in the summarized event data 124. By way of example, the set of features may include any of a number of packets received from a particular source address, a destination address, a packet identifier, a process identifier, a time at which the event occurred, and/or the like. In some examples, the processor 104 may maintain a counter that may track the number of events that have been detected and the processor 104 may summarize the event data that have been identified from a previous time that the counter reached a predefined value and a current time that the counter reached the predefined value.

In addition, the processor 104 may identify the set of features defined in the summarization instructions in the event data that the processor 104 identified as matching the event defined in the query 122. For instance, the processor 104 may identify a subset of the elements of a packet that correspond to the set of features defined in the summarization instructions. The processor 104 may also include the identified set of features in the summarized event data 124. In other words, the processor 104 may omit features of the identified event data that do not correspond to the set of features defined in the summarization instructions. As a result, the summarized event data 124 may have a relatively smaller number of features and may thus have a relatively smaller file size as compared with the identified event data.

The processor 104 may fetch, decode, and execute the instructions 208 to output the summarized event data 124. That is, the processor 104 may output, e.g., upload, the summarized event data 124 to the server 120 via the network 140. As discussed herein, by outputting the summarized event data 124 identified as matching the query 122, the amount of network bandwidth consumed to comply with the query 122 received from the server 120 may be reduced, e.g., minimized. In addition, the size of the data store 130 on which the server 120 may store the received summarized event data 124 may be reduced by storing the summarized event data 124 instead of the identified event data.

According to examples, the query 122 may define a time interval at which the summarized event data 124 is to be outputted. In these examples, the processor 104 may continuously implement the query 122 to identify the event data, for instance, from continuously updated event data. The processor 104 may also continuously summarize the identified event data to generate new summarized event data 124 and may output the new summarized event data 124 at the defined time interval. As such, for instance, the processor 104 may implement a standing query on the event data.

Although particular reference is made herein to the processor 104 identifying event data pertaining to the apparatus 102-1 that match the event defined in the query 122, it should be understood that the processor 104 may instead identify a plurality of event data pertaining to the apparatus 102-1 that match the event defined in the query 122. In these examples, the processor 104 may summarize each of the identified plurality of event data to generate the summarized event data 124. In addition, the summarized event data 124 may have a smaller file size than the plurality of event data.

Instead of the machine readable instructions 202-208, the apparatus 102-1 may include hardware logic blocks that may perform functions similar to the instructions 202-208. In other examples, the apparatus 102-1 may include a combination of instructions and hardware logic blocks to implement or execute functions corresponding to the instructions 202-208. In any of these examples, the processor 104 may implement the hardware logic blocks and/or execute the instructions 202-208. As discussed herein, the apparatus 102-1 may also include additional instructions and/or hardware logic blocks such that the processor 104 may execute operations in addition to or in place of those discussed above with respect to FIG. 2.

Figure 3:
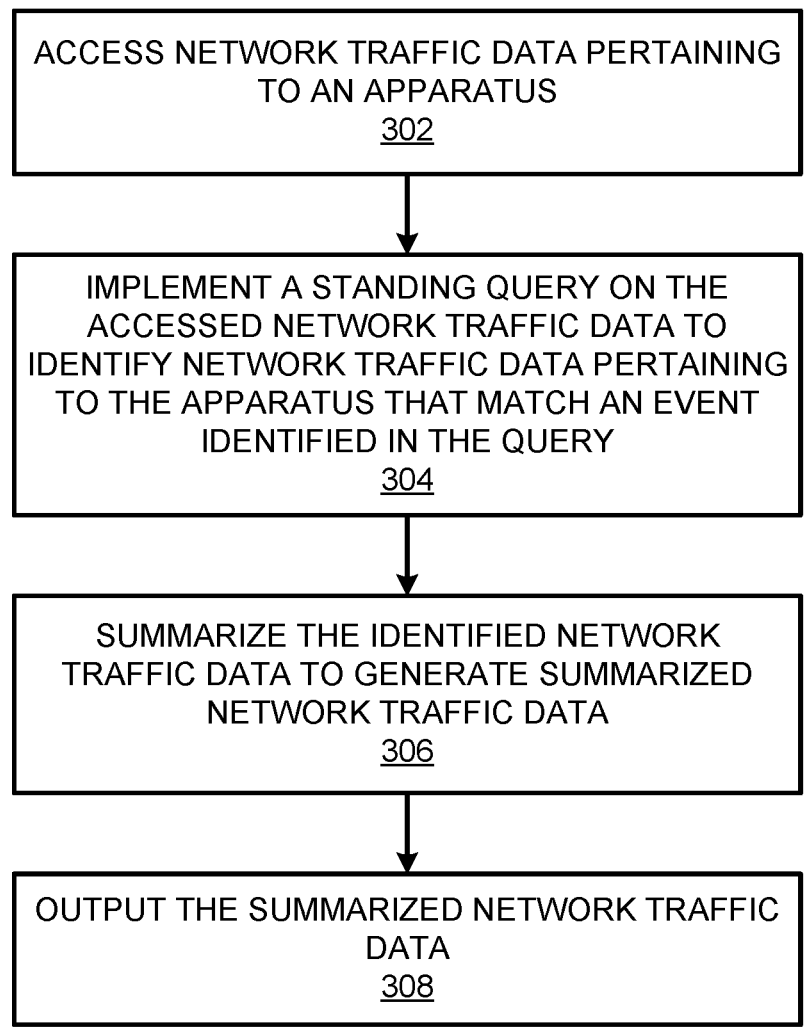
FIG. 3 depicts a flow diagram of a method for generating and outputting summarized network traffic data pertaining to an apparatus, in accordance with an embodiment of the present disclosure.

Various manners in which the processor 104 of the apparatus 102-1 may operate are discussed in greater detail with respect to the method 300 depicted in FIG. 3. Particularly, FIG. 3 depicts a flow diagram of a method 300 for generating and outputting summarized network traffic data pertaining to an apparatus 102-1, in accordance with an embodiment of the present disclosure. It should be understood that the method 300 depicted in FIG. 3 may include additional operations and that some of the operations described therein may be removed and/or modified without departing from the scope of the method 300. The description of the method 300 is made with reference to the features depicted in FIGS. 1-2 for purposes of illustration.

At block 302, the processor 104 may access network traffic data pertaining to an apparatus 102-1. As discussed herein, the event tracer 108 may track the network traffic pertaining to the apparatus 102-1, e.g., network traffic that the apparatus 102-1 receives and/or that passes through the apparatus 102-1. In some examples, the processor 104 may access the network traffic data from the event tracer 108 directly, e.g., in or almost in real-time, as the network traffic data is collected, or the like. In this regard, the processor 104 may apply a filter on (or equivalently, summarize) the event data received from the event tracer 108 in real-time, e.g., as the event data is live streamed to the processor 104.

At block 304, the processor 104 may implement a standing query on the accessed network traffic data to identify network traffic data pertaining to the apparatus 102-1 that match an event identified in the query 122. As such, the processor 104 may identify the network traffic data that match an event, such as an event identifier, defined in the query 122. As discussed herein, the processor 104 may receive the query 122 from a server 120 via a network 140, in which the query 122 may define the event to which the identified network traffic data on the apparatus 102-1 is to match. As the processor 104 may receive the event data from the event tracer 108 in real-time or in near real-time, the processor 104 may continuously implement the query, e.g., perform a standing query, on the event data as the event tracer 108 collects the event data.

At block 306, the processor 104 may summarize the identified network traffic data to generate summarized network traffic data 124 responsive to the standing query. The processor 104 may summarize the identified network traffic data to comply with summarization instructions, which may also be defined in the query 122. As discussed herein, the summarization instructions may define a set of features in the identified network traffic data that are to be included in the summarized network traffic data 124. In addition, the processor 104 may identify the set of features in the identified network traffic data and may include the identified set of features in the summarized network traffic data 124.

At block 308, the processor 104 may output the summarized network traffic data 124, in which the summarized network traffic data 124 may have a smaller file size than a file size of the identified network traffic data. The processor 104 may output the summarized network traffic data 124 to the server 120 or to another server.

According to examples, the query 122 may define a time interval at which the summarized network traffic data 124 is to be outputted. In these examples, the processor 104 may continuously implement the query 122 to identify the network traffic data, for instance, from accessing continuously updated network traffic data. The processor 104 may also continuously summarize the identified network traffic data to generate new summarized network traffic data 124 and may output the new summarized network traffic data 124 at the defined time interval.

According to examples, the processor 104 may identify a plurality of network traffic data pertaining to the apparatus 102-1 that match the event defined in the query 122. In these examples, the processor 104 may summarize each of the identified plurality of network traffic data to generate the summarized network traffic data 124. In addition, the summarized network traffic data 124 may have a smaller file size than the identified plurality of network traffic data.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 4:
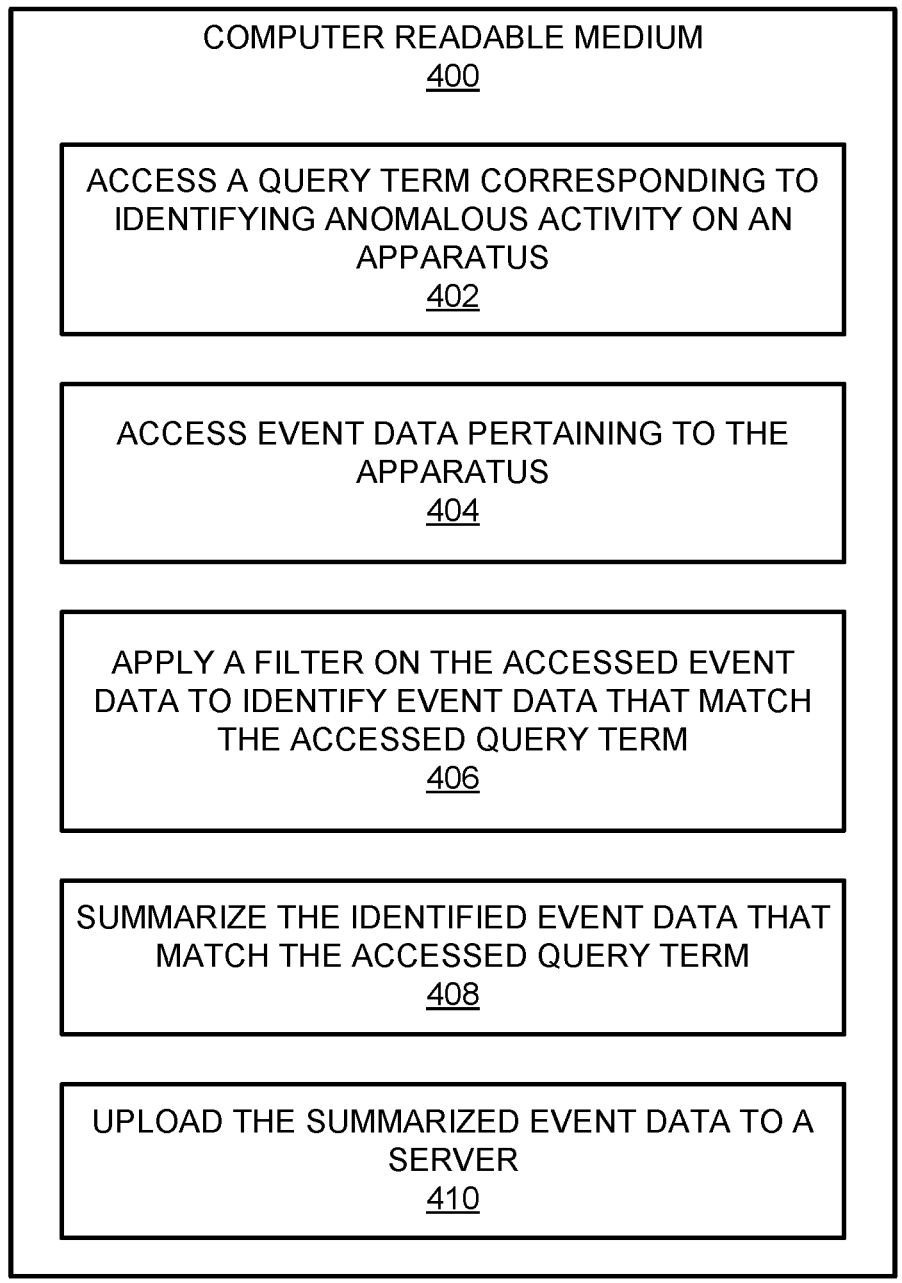
FIG. 4 depicts a block diagram of a computer readable medium that may have stored thereon machine readable instructions that when executed by a processor, may cause the processor to generate and output summarized event data pertaining to an apparatus to a server, in accordance with an embodiment of the present disclosure.

Turning now to FIG. 4, there is shown a block diagram of a computer readable medium 400 that may have stored thereon machine readable instructions that when executed by a processor, may cause the processor to generate and output summarized event data pertaining to an apparatus 102-1 to a server in accordance with an embodiment of the present disclosure. It should be understood that the computer readable medium 400 depicted in FIG. 4 may include additional instructions and that some of the instructions described herein may be removed and/or modified without departing from the scope of the computer readable medium 400 disclosed herein. The computer readable medium 400 may be a non-transitory computer readable medium. The term "non-transitory" does not encompass transitory propagating signals.

The computer readable medium 400 may have stored thereon machine readable instructions 402-410 that a processor, such as the processor 104 depicted in FIGS. 1 and 2, may execute. The computer readable medium 400 may be an electronic, magnetic, optical, or other physical storage device that contains or stores executable instructions. The computer readable medium 400 may be, for example, Random Access memory (RAM), an Electrically Erasable Programmable Read-Only Memory (EEPROM), a storage device, an optical disc, and the like.

The processor may fetch, decode, and execute the instructions 402 to access a query term corresponding to identifying anomalous activity on an apparatus 102-1. The query term may be equivalent to the event defined in a query 122 as discussed herein. In addition, the query term may be a term or event that may be used to determine whether events occurring on the apparatus 102-1 may be anomalous. The processor may fetch, decode, and execute the instructions 404 to access event data pertaining to the apparatus 102-1, for instance, in any of the manners discussed herein.

The processor may fetch, decode, and execute the instructions 406 to apply a filter on the accessed event data to identify event data that match the accessed query term. That is, the processor may filter the accessed event data to determine which of the accessed event data include a term that matches the accessed query term. The filtering may be similar to the execution of the query discussed herein. In one regard, the processor may continuously apply the filtering on the accessed event data, e.g., as the event data is live streamed to the processor.

The processor may fetch, decode, and execute the instructions 408 to summarize the identified event data that match the accessed query term to generated summarized event data 124. The summarized event data 124 may have a smaller file size than a file size of the identified event data. The processor may summarize the identified event data based on features defined in summarization instructions as discussed herein. In addition, the processor may fetch, decode, and execute the instructions 410 to upload the summarized event data 124 to a server 120. In addition, the processor may execute the instructions 402-410 at a defined interval of time as also discussed herein, for instance, to continuously upload summarized event data to the server 120.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a non-transitory computer readable medium storing instructions that when executed by the processor cause the processor to:
receive a query from a server, wherein the query defines:
a specific type of event that occurred at the apparatus to be identified;
summarization instructions to summarize event data related to the specific type of event; and
a time interval for generating the summarized event data;
execute the query on the apparatus to identify the event data related to the specific type of event that occurred at the apparatus as defined in the query;
summarize the identified event data according to the summarization instructions in the query to generate the summarized event data responsive to the query; and output the summarized event data at the time interval defined in the query.

2. The apparatus of claim 1, wherein the instructions are further executable to cause the processor to:
access the event data as the event data is received by the apparatus as a stream of data; and
continuously implement the query on the accessed event data.

3. The apparatus of claim 1, wherein the instructions are further executable to cause the processor to:
access a log of the event data; and
execute the query on the accessed log of the event data.

4. The apparatus of claim 1, wherein the event data comprises network traffic data that occurred at the apparatus.

5. The apparatus of claim 1, wherein the summarization instructions define a set of features in the identified event data to be included in the summarized event data and wherein the instructions are further executable to cause the processor to:
identify the set of features in the identified event data; and
include the identified set of features into the summarized event data.

6. The apparatus of claim 5, wherein the identified event data corresponds to a packet and wherein the set of features defined in the summarization instructions comprises a subset of elements of the packet.

7. The apparatus of claim 1, wherein the instructions are further executable to cause the processor to:
continuously execute the query to identify the event data, summarize the identified event data, and output the summarized event data at the time interval defined in the query.

8. The apparatus of claim 1, wherein the instructions are further executable to cause the processor to:
execute the query to identify a plurality of event data related to the specific type of event that occurred at the apparatus as defined in the query; and
summarize each of the identified plurality of event data to generate the summarized event data, wherein the summarized event data has a smaller file size than the plurality of event data.

9. A method comprising:
receiving, by a processor of an apparatus, a query from a server, wherein the query defines:
a specific type of network traffic data that occurred at the apparatus to be identified,
summarization instructions to summarize the network traffic data, and
a time interval for generating the summarized network traffic data;
executing, by the processor, the query to identify the network traffic data that occurred at the apparatus as defined in the query;
summarizing, by the processor, the identified network traffic data according to the summarization instructions in the query to generate the summarized network traffic data responsive to the query; and
outputting, by the processor, the summarized network traffic data at the time interval defined in the query.

10. The method of claim 9, wherein the summarized network traffic data has a smaller file size than a file size of the identified network traffic data.

11. The method of claim 9, wherein the summarization instructions define a set of features in the identified network traffic data to be included in the summarized network traffic data and wherein the method further comprises:
identifying the set of features in the identified network traffic data; and
including the identified set of features into the summarized network traffic data.

12. The method of claim 9, wherein the method further comprises accessing the network traffic data as the network traffic data is collected by the apparatus.

13. The method of claim 9, wherein the method further comprises accessing the network traffic data from a log of the network traffic data.

14. The method of claim 9, wherein the method further comprises:
continuously executing the query to identify the network traffic data, continuously summarizing the identified network traffic data, and outputting the summarized network traffic data at the time interval defined in the query.

15. The method of claim 9, wherein the query defines a certain event identifier of the specific type of network traffic data and wherein the method further comprises:
executing the query to identify the network traffic data on the apparatus that match the certain event identifier; and
summarizing the identified network traffic data to include features of the identified network traffic data corresponding to the certain event identifier.

16. A non-transitory computer readable medium storing instructions that when executed by a processor, cause the processor to:
receive a query from a server, wherein the query defines:
a specific type of event that occurred at an apparatus to be identified,
summarization instructions to summarize event data related to the specific type of event, and
a time interval for generating the summarized event data;
access event data pertaining to the apparatus;
apply a filter on the accessed event data to identify the event data related to the specific type of event as defined in the query;
summarize the identified event data according to the summarization instructions to generate the summarized event data; and
upload the summarized event data to a server at the time interval defined in the query.

17. The non-transitory computer readable medium of claim 16, wherein the instructions are further executable to cause the processor to:
access the event data as the event data is received by the apparatus as a live stream; and
apply the filter on the accessed event data as the event data is received as a live stream to identify the event data related to the specific type of event as defined in the query.

18. The non-transitory computer readable medium of claim 16, wherein the summarized event data has a smaller file size than a file size of the identified event data.

19. The non-transitory computer readable medium of claim 16, wherein the instructions are further executable to cause the processor to:
receive a defined set of features that are to be included in the summarized event data;
identify the set of features of the identified event data; and
include the identified set of features of the identified event data in the summarized event data while omitting other features of the identified event data from the summarized event data.

20. The non-transitory computer readable medium of claim 16, wherein the instructions are further executable to cause the processor to:
- continuously access the event data;
- continuously apply the filter on the accessed event data to identify the event data related to the specific type of event as defined in the query;
- continuously summarize the identified event data to generate the summarized event data; and
- output the summarized event data at the time interval defined in the query.

* * * * *